United States Patent
Jurado Blazquez

(10) Patent No.: US 9,333,527 B2
(45) Date of Patent: May 10, 2016

(54) NOZZLE FOR APPLYING SEALANTS

(71) Applicant: Miguel Jurado Blazquez, Madrid (ES)

(72) Inventor: Miguel Jurado Blazquez, Madrid (ES)

( * ) Notice: Subject to any disclaimer, the term of this patent is extended or adjusted under 35 U.S.C. 154(b) by 0 days.

(21) Appl. No.: 13/976,916

(22) PCT Filed: Oct. 31, 2012

(86) PCT No.: PCT/ES2012/000275
§ 371 (c)(1),
(2) Date: Jun. 27, 2013

(87) PCT Pub. No.: WO2013/064708
PCT Pub. Date: May 10, 2013

(65) Prior Publication Data
US 2014/0312148 A1  Oct. 23, 2014

(30) Foreign Application Priority Data
Oct. 31, 2011  (EP) ..................... 11380089

(51) Int. Cl.
*B05C 17/005* (2006.01)
*B05C 5/02* (2006.01)
*F16B 19/00* (2006.01)
*F16B 33/00* (2006.01)

(52) U.S. Cl.
CPC ......... *B05C 17/00516* (2013.01); *B05C 5/0208* (2013.01); *B05C 17/0052* (2013.01); *B05C 17/00513* (2013.01); *F16B 19/008* (2013.01); *F16B 33/004* (2013.01)

(58) Field of Classification Search
CPC ................................ B05C 17/00516
USPC ......... 239/553–554, 499, 504, 596, 569, 573, 239/461, 460, 518, 214, 469–470, 590, 239/590.3; 264/263, 268–269; 222/566–568, 575, 571
See application file for complete search history.

(56) References Cited

U.S. PATENT DOCUMENTS

| | | | | |
|---|---|---|---|---|
| 2,657,951 A * | 11/1953 | North, Jr. | ............... | B65D 25/40 215/309 |
| 4,971,745 A * | 11/1990 | Ferenc et al. | ................. | 264/263 |
| 5,322,381 A * | 6/1994 | Argo, II | ............................. | 401/9 |
| 7,806,348 B2 * | 10/2010 | Kline et al. | .................... | 239/478 |
| 8,028,935 B2 * | 10/2011 | Leber | ............................. | 239/436 |
| 2006/0024122 A1 * | 2/2006 | Nealon et al. | .................. | 401/266 |
| 2011/0024943 A1 * | 2/2011 | Kelley et al. | .................... | 264/263 |
| 2011/0091590 A1 * | 4/2011 | McMahon et al. | ............... | 425/87 |

* cited by examiner

*Primary Examiner* — Len Tran
*Assistant Examiner* — Tuongminh Pham
(74) *Attorney, Agent, or Firm* — Hector M. Reyes Rivera

(57) ABSTRACT

A nozzle that includes a connecting section, a main hollow elongated and conical body, a bell shaped section and an injection bottom is described. The design of the connecting section allows it to be connected to injections machines or to a sealant containing cartridges. The injection button is non-permanently connected to the bell shaped section and it has a circular central protrusion, a series of radially oriented channels ending in circularly positioned openings, which facilitates the direction of the expelled sealant. Alternatively, the button may also include lateral grooves at the walls of the central circular protrusion. The particular design of the injection button allows an efficient and highly accuracy distribution of the sealant on the surfaces and selected parts of machines and artifacts wherein the sealant is applied.

6 Claims, 4 Drawing Sheets

NOZZLE FOR APPLYING SEALANTS

CROSS REFERENCE TO RELATED APPLICATIONS

This application is the national stage of International Application NO. PCT/ES2012/000275, filed Oct. 31, 2012, and claims priority of European Patent Application No. 11380089.0 filed Oct. 31, 2011, both of which applications are incorporated by reference herein in their entirety.

TECHNICAL FIELD OF THE INVENTION

This invention relates to devices for applying sealants such as silicones and the like in multiples artifacts or machines such as automobiles, trains, ships and aircrafts, therefore, it is useful in diverse industries such as aviation, automotive, naval, railway, and robotics or similar industries. More particularly, the invention is directed to a nozzle, comprising a bell or hood lower section that is coupled in a non-permanent manner to an injection button with a particular design, which is highly useful in applying silicone and similar sealants on said artefacts and machines.

BACKGROUND OF THE INVENTION

The manufacturing of machines and other related artefacts or accessories in several industries, such as aviation, automobile, naval, railway, robotics and the like requires processes wherein it is necessary the application of silicones and similar or related sealants to said machines or artefacts, particularly during its manufacture processes. Sealants application requires the use of nozzles in order to apply said sealants to the machines or artefacts from a sealant-container, such as cartridges or injection machines. Thus, the sealant may be applied with a nozzle manually and directly from cartridges filled with sealant, or by an extrusion or manual gun, as those currently available in the market and known in the art. Some of the nozzles known in the art are made of metal and are intended to be reusable; particularly those meant to be used in injections machines, thus they must be cleaned up with solvent or products specifically prepared for such cleaning purpose. Such solvents or cleaning products are hazardous, abrasive and highly irritant to the skin. Furthermore, the design of said nozzles does not allow their use with both manual cartridges and automatic processes using injection machines, nor they have a precision dispersion of the sealant as required in, for instance, sealing operations involving injecting sealants in the chamfers in which rest the heads of rivets and screws or in the walls of orifices, wherein highly precise sealant application is needed and required.

OBJECTS AND SUMMARY OF THE INVENTION

The above drawbacks and needs are overcome by a nozzle for applying sealants with a bell or hood lower section and an injection button as described herein, which provides several advantageous and novel characteristics for its intended function inherent to its innovative organization and construction, which will be described in detail further below, and which represents a considerable improvement with respect to what is currently known in the market in its field of application.

One of the main the objective of the invention is to provide a nozzle that once it is connected to a cartridge or injection machine, facilitates the injection of silicone or other sealants in multiple industrial applications. Another objective of the invention is to provide a nozzle having an outlet shaped as a bell or hood in order to facilitate the encapsulation of rivets or screws, particularly applicable in the aeronautical industry, having the innovative characteristic that it also has an injection button coupled to the end section of said bell or hood, said button having a special design with a number of channels and orifices for carrying out sealing operations with greater accuracy, allowing to guide the injection of the sealant around the rivets and nuts. In yet another objective of the invention is to provide a nozzle having a button section that by its particular design substantially improving the encapsulation and providing an optimum sealing of rivets and nuts, and that allows the user to apply sealant operations both manually and by automated sealant injection machines. In still another objective of the instant invention is to provide a nozzle having a bell or hood lower section for sealing rivets and nuts, which may be used in the aviation industry and the automotive, naval, railway and robotics industries.

BRIEF DESCRIPTION OF THE DRAWINGS

The foregoing and additional features and characteristics of the embodiments of the present invention will become more apparent from the following detailed description considered with reference to the accompanying drawings, which are used herein in a manner of example only, and wherein.

DETAILED DESCRIPTION OF THE INVENTION

The following detailed description illustrates the invention by way of example and is not limited to the particular limitations presented herein as principles of the invention. This description is directed to enable one skilled in the art to make and use the invention by describing embodiments, adaptations, variations and alternatives of the invention. Potential variations of the limitations herein described are within the scope of the invention. Particularly, the size and shapes of the invention's elements illustrated in the discussion may be varied and still provide embodiments having different sizes or geometric shapes, that are within the scope of the instant invention.

The instant invention is directed to a nozzle for applying silicones and similar sealants, said nozzle comprising a bell or hood shaped tip and an injection button, which provides several advantageous and novel characteristics for its intended function inherent to its innovative organization and construction, which will be described in detail further below, and which represents a considerable improvement with respect to what is currently known in the market in its field of application.

Figure 1:
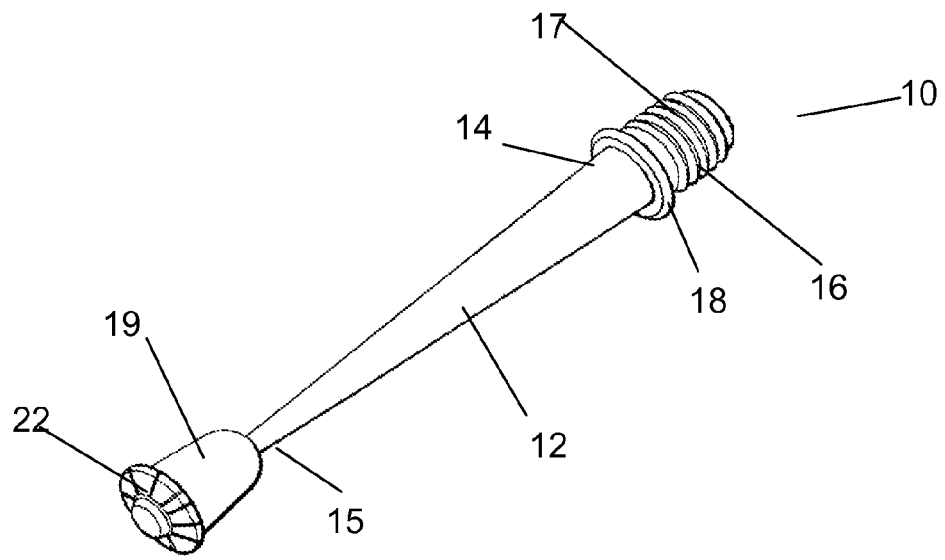
FIG. 1 shows a diagrammatic representation in perspective view of an example of one preferred embodiment of the nozzle for applying sealants, according to the instant invention, said representation illustrating general outer configuration, and its main parts or elements.
Figure 2:
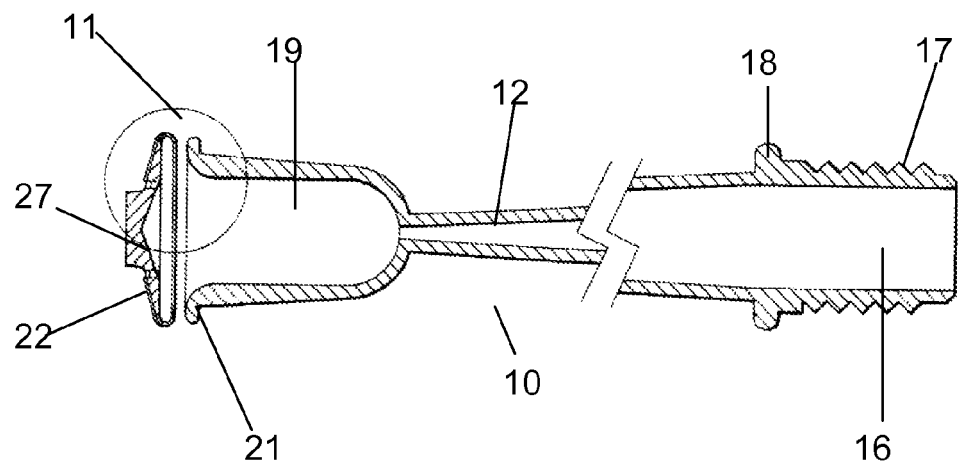
FIG. 2 shows a cross sectional view along a longitudinal axis of the nozzle according to the invention already shown FIG. 1.

A first embodiment of the invention is illustrated in FIG. 1 wherein the nozzle embodiment 10 is illustrated. FIG. 2 illustrates a diagrammatically representation of a cross sectional view of nozzle 10. The nozzle 10 comprises a main elongated hollow body 12 having a truncated cone shape. Said elongated body 12 comprises a first end 14 and a second end 15. First end 14 has a wider diameter that second end 15. Thus, said hollow body 12 provides an internal hollow cavity as shown in the cross sectional FIG. 2, which is empty, decreases and continuously the internal area toward second end 15.

Physically connected to first end 14, nozzle 10 comprises connecting hollow round section 16, which comprises a threaded exterior surface 17, which allows nozzle 10 to be connected to a silicone or similar sealant cartridge or injection machine. Said threaded section thus allows the coupling of nozzle 10 to most cartridges or machines present in the market, adding versatility in the manner that nozzle 10 is used. Connecting section 16 also comprises external protruding ring 18, which is surrounding the external end of said connecting section 16 that is in direct physical contact with said first end 14 of the main elongated body 12. Protruding ring 18 stops against the cartridge or gun to which nozzle 10 is coupled, as it is the union between the nozzle 10 and the cartridge thus providing or establishing a precision adjustment of nozzle 10 to the sealant container cartridge or injection machine. As expected and as shown in FIG. 2, the interior of hollow connecting unit 16 provides an internal cavity which is empty, positioned perpendicularly and in direct and open communication with the internal cavity of main elongated body 12.

At the second end 15, nozzle 10 comprises a hollow and symmetrical bell or hood shaped section 19, physically connected to the second end 15 of said main elongated body 12. More particularly, second end 15 of main elongated body 12 is physically and directly connected at the top of the bell shaped unit 19. As illustrated in cross section, along a longitudinal axis or line of the nozzle 10 in FIG. 2, at its peripheral end, bell shaped section 19 has an annular flanged section 21 around its peripheral end or contour, simulating a curved lid, as illustrated in FIG. 2. It should be also noted that since bell shaped section 19 is hollow as previously mentioned, it thus provides an internal cavity which is empty and is in open communication with the internal cavity of elongated body 12, as illustrated in FIG. 2. Said cavity of the hollow bell shaped unit 19 is perpendicularly positioned to the internal cavity of elongated body 12.

Bell shaped section 19 is sized to encapsulate rivets or nuts in order to cover them completely with the sealing material. As known in the machine assembling arts, such rivets and nuts are usually inserted fastened through countersink holes, which required to be sealed with a proper sealant after such fastening means have been fastened. Such connection elements and process are discussed below in details. Main elongated body 12, round connecting section 16 and bell shaped section 19 may constitute a single unit, physically connected.

Figure 3:
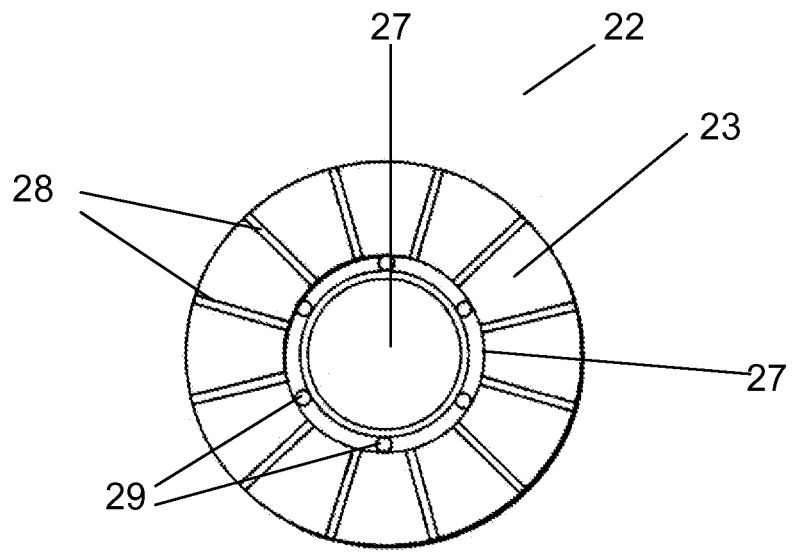
FIG. 3 shows a diagrammatic illustration of the plan view of one preferred embodiment the injection button incorporated in the nozzle according to the instant invention.
Figure 4:
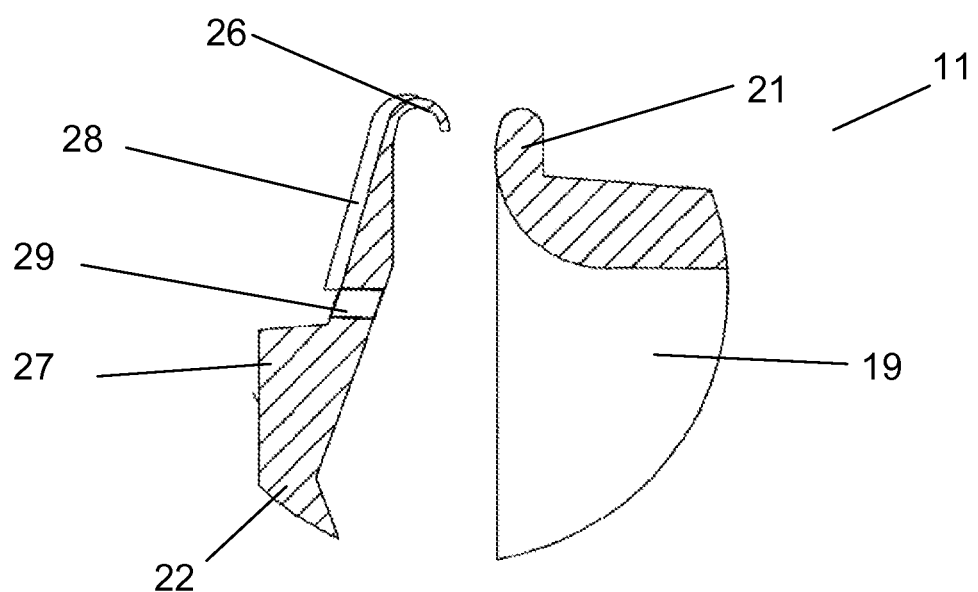
FIG. 4 shows a diagrammatic representation of an enlarged view of section 11 on FIG. 2, wherein the detail of the configuration of the coupling or matching between the bell-shaped tip or lower section of the nozzle and the injection button is illustrated.

Connected to the peripheral annular flanged section 21 of the bell-shaped section 19, nozzle 10 also comprises injection button 22, which is diagrammatically illustrated in FIG. 3. It comprises a circular main body 23 having a front and back surfaces and a peripheral groove section 26 around the end or peripheral circumference of said circular main body 23 as illustrated in FIG. 4. On its front surface, injection button 22 comprises a cylindrical or hollow circular protrusion 27, which is centrally projected from said main body 23, and multiple series of radially oriented channels 28 located across front and back surfaces of circular main body 23, ending in orifices 29 which are distributed around said cylindrical or circular protrusion 27; thus providing a direct fluid communication with the interior of the internal cavity of the hollow bell-shaped section 19. As illustrated in FIG. 2, internal cavities of (1) connecting unit 16; (2) the main elongated body 12 and (3) bell-shaped unit 19 are interconnected in a continuous, perpendicular and straightforward position, thus creating a straight and unidirectional fluid path for the sealant to be discretely discharged using the nozzle 10.

As illustrated diagrammatically in FIG. 4, which illustrates section 11, the annular flanged section 21 of the bell shaped section 19 cooperatively matches or snaps with the peripheral groove 26 of injection button 22, allowing a strong and firm non-permanent connection or coupling of button 22 to the bell shaped section 19. Once coupled to the bell-shaped section 19, the button 22 covers the exit or mouth of bell shaped section 19.

The whole structure of nozzle 10 is preferably made of plastic, preferably of polypropylene.

Figure 5:
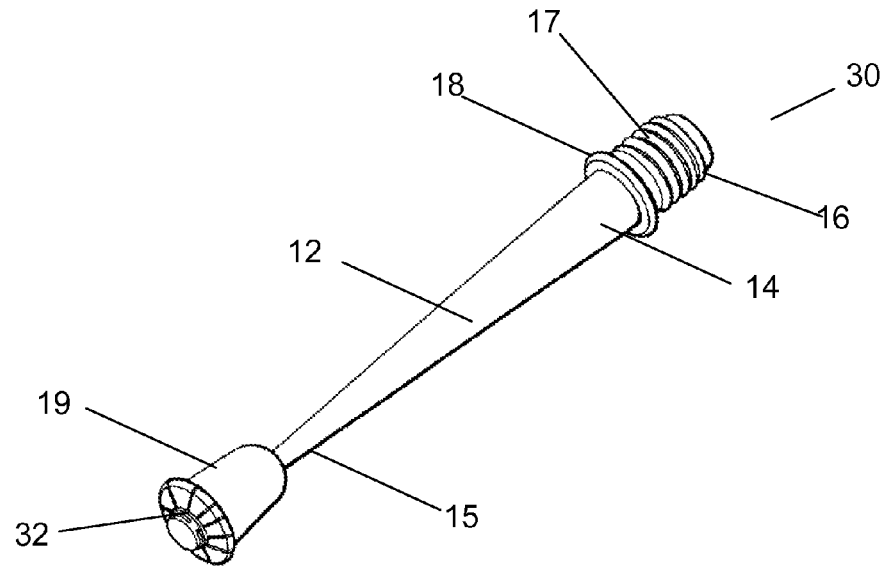
FIG. 5 shows a diagrammatic representation in perspective view of an example of another embodiment of the nozzle for applying sealants, according to the instant invention, said representation illustrating general outer configuration, and its main parts or elements and comprising a button comprising lateral outlets or openings.
Figure 6:
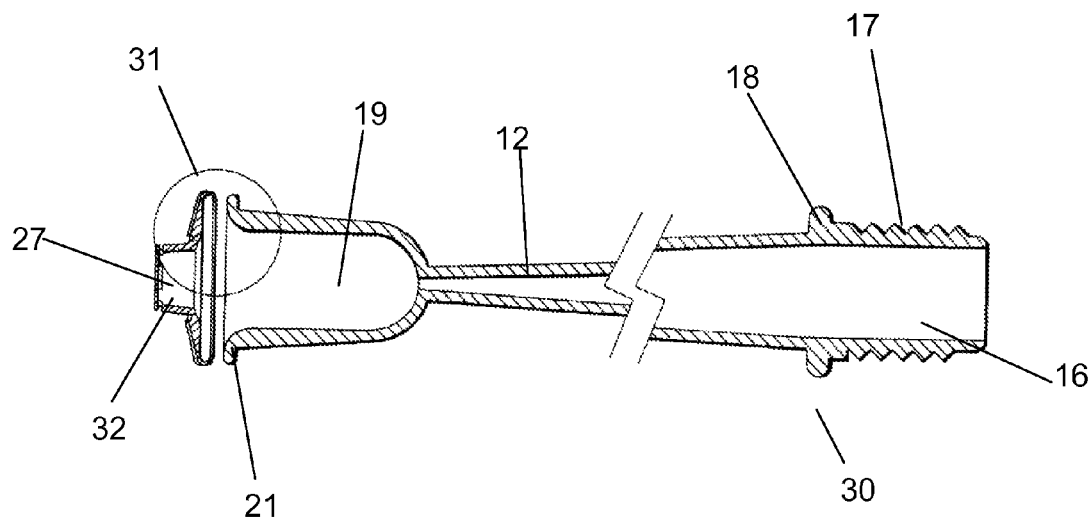
FIG. 6 shows a cross sectional view along a longitudinal axis of the nozzle according to the invention already shown FIG. 5.
Figure 7:
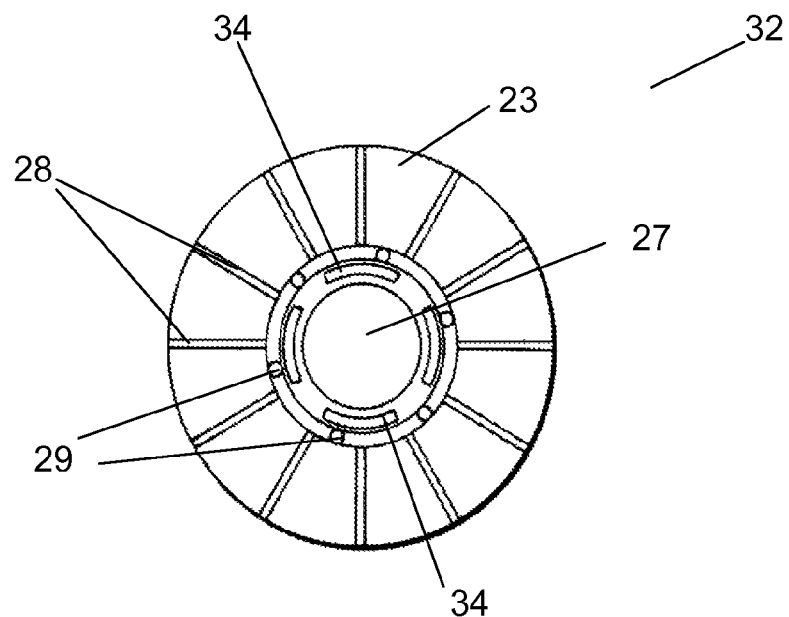
FIG. 7 shows a diagrammatic illustration of the plan view of a second preferred embodiment of the injection button incorporated in the nozzle according to the instant invention, already illustrated in FIGS. 5 and 6, wherein such button comprises lateral outlets or openings.

FIGS. 5 to 8 diagrammatically illustrate a second preferred embodiment 30 according to the invention. Embodiment 30 is similar to embodiment 10 since both embodiments comprise a main elongated hollow body 12 having a truncated cone shape; a hollow round and threaded section 16 and a bell or hood shaped section 19 wherein said main parts have the same elements already described previously and wherein the said sections are connected as previously described and illustrated particularly as illustrated in FIGS. 5 and 6. However, second embodiment 30 comprises injection button 32 in place of injection button 22. As described previously regarding injection button 22 injection button 32 as illustrated diagrammatically in FIGS. 5, 6 7 and 8 and particularly in FIG. 7, comprises a circular main body 23 having a front and back surfaces and a peripheral groove section 26 around the end or peripheral region of said circular main body 23. On its front surface, injection button 32 comprises hollow central cylindrical or circular protrusion 27, which is projected from said main body 23 and also comprises multiple series of radially oriented channels 28, which are distributed around said cylindrical or circular protrusion 27; thus providing a direct fluid communication with the interior of the internal cavity of the hollow bell-shaped section 19 and ending in orifices 29 which are distributed around said cylindrical or circular protrusion 27. Contrary to injection button 22, nonetheless and as illustrated in FIG. 7, injection button 32 comprises a series of lateral grooves or openings 34, located around the lateral sides or circumference of said cylindrical or circular protrusion 27.

Figure 8:
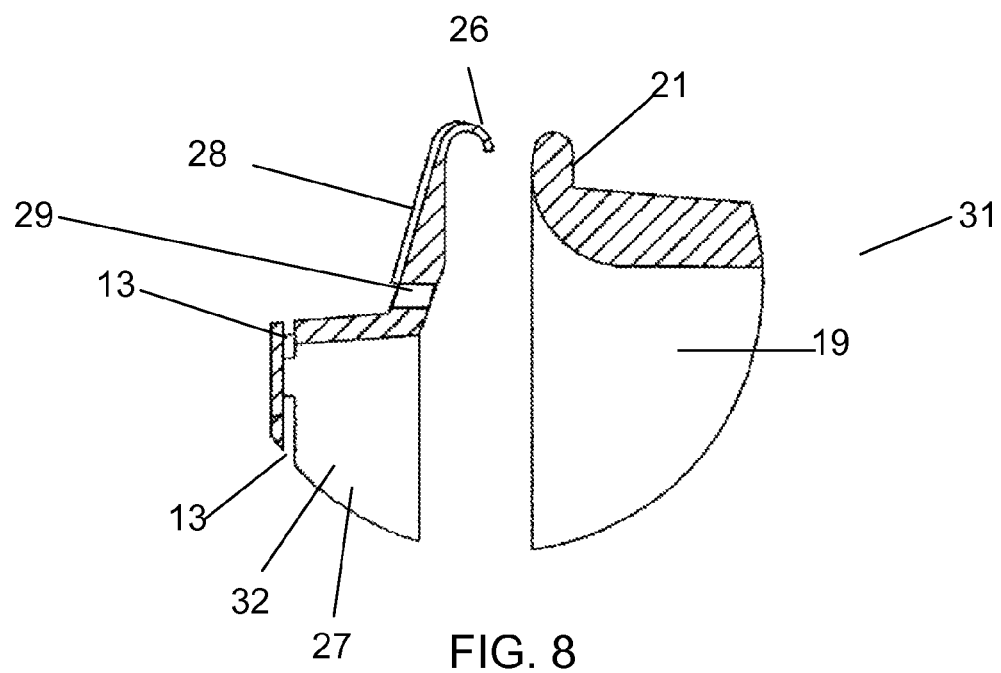
FIG. 8 shows a diagrammatic representation of an enlarged view of section 31 on FIG. 6, wherein the details of the configuration of the coupling or matching between the bell-shaped tip or lower section of the nozzle and the injection button of the embodiment illustrated in FIG. 5 are illustrated.

As in the case of embodiment 10, and has illustrated diagrammatically in FIG. 8, which shows the detailed view of section 31 in embodiment 32, the annular flanged section 21 of the bell shaped section 19 cooperatively match with the peripheral groove 26 of injection button 32, allowing a strong and firm non-permanent connection or coupling of button 32 to the bell shaped section 19. Once coupled to the bell-shaped section 19, the button 32 covers the exit or mouth of bell shaped section 19.

In operational terms, the nozzle according to the instant invention may be coupled or connected to most cartridges or machines containing sealant which are present in the market or commercially available by threading connecting hollow round section 16 to the sealant containing cartridge or injection machine. The protruding ring 18 acts as a stopper in the insertion or threading of the cartridge and reinforces the area of greatest pressure, which is the union between the nozzle and the cartridge, allowing the achievement of precision adjustment. The sealant then may enter to the interior of the main hollow elongated conical body 12 via threaded hollow section 16, which is the sealant inlet point of the nozzle herein described. From the central section of the main hollow elongated body 12, the sealant is expelled out of the nozzle via the bell or hood shaped section 19, which acts as the sealant outlet point. The shape of bell shaped section 19 being meant for encapsulating rivets or nuts in order to cover them completely in the sealing material. Once the sealant is expelled from the bell shaped section 19, it most moves out through injection bottom 22, which is fitted or coupled in a strong but non-permanent manner to the bell shaped section 19. Due to said non-permanent coupling, button 22 may be fitted to or remove from bell shaped section 19 at the user's will. The particular design of this button, with channels 28 and orifices 29, allows executing different precision sealing operations. Specifically, it allows directing the flow of sealing material in two different ways: (1) towards the chamfers in which the rivet heads are adjusted, by means of the series of radially positioned channels 28, that lead to through orifices 29 located at annular area 27 of the central part of the button or alternatively, and (2) when using injection button 32, towards the walls of the orifice in which the screws are inserted, by means of lateral outlets 34 provided in an alternative embodiment of the button 32, which has a hollow central part 27. In this manner, the plugging of the orifice in which the screw is inserted is prevented, which is important in order to allow its subsequent riveting.

The sealant applying operations are performed after drilling orifices in the various claddings or parts to be joined, by a riveting that will consequently be fast, clean and uniform, since the appropriate doses of sealant have been applied at the specific points described, as enabled by this system.

The application of the sealant with the nozzle according to the instant invention may be performed either manually, by cartridges filled with silicone or other sealing materials, or by an extrusion or manual gun, as those currently available in the market. The used of the nozzle according to the invention in applying sealants provides a perfect seal from air and oxidising liquids, which is very important for the pressurisation and lifetime of aircrafts, ships, trains or automobiles.

Finally, it is worth mentioning that once the aforementioned sealing operations are performed, simply cutting the anterior part of the nozzle with a bell shape, a traditional truncated-cone shaped nozzle is obtained that may be used to apply sealing cords, filler sealant or safety cords that ensure that there is no liquid between two parts joined by rivets and leaving fully sealed the fuel tanks or other elements made from parts joined by rivets. Therefore, the nozzle according to the instant invention disclosed herein provides a device that simplifies the sealing work in both the aesthetic appearance and speed of execution, thus, reducing the sealant application time. As a consequence, the herein disclose nozzle reduce the sealant application time, thus saving time and labour, provides a more economical sealing process and increases the quality of the resulting sealant application simultaneously.

While the invention has been described in conjunction with some embodiments, it is to be understood that many alternatives, modifications, and variations will be apparent to those skilled in the art in light of the forgoing description. Accordingly, the invention is intended to embrace all such alternatives, modifications and variations falling within the spirit and scope of the appended claims.

What is claim is:

1. A nozzle for applying sealants from a sealant containing container, such as cartridges, guns or injection machines, said nozzle comprising:
    (a) a truncated cone-shaped main elongated body, comprising:
        a first end;
        a second end;
        a truncated cone-shaped internal cavity;
    (b) a cylindrical section comprising:
        a first end;
        a second end, physically connected to the first end of the truncated cone-shaped main elongated body;
        a threaded external surface;
        an external protruding ring surrounding the second end of said cylindrical section and;
        and internal cylindrical cavity in direct and open communication with the truncated cone-shaped internal cavity;
    (c) a bell-shaped section, said bell shaped comprising:
        a top section, which is physically connected to the second end of said truncated cone shaped elongated body;
        a lower section;
        bell-shaped internal cavity, which is in open and in straight communication with the truncated cone-shaped internal cavity of said truncated cone-shaped elongated body;
        an outwardly projected annular flanged section perpendicularly located around the lower section of said bell-shaped lower section;
    (d) a round shape injection button, said injection button comprising:
        a disk-shaped round main body, said disk-shaped main body comprising:
            a front flat, round surface;
            a back flat round surface;
            a curved continuous edge projected outwardly in reference to the front surface that surrounds the distal edge in reference to the center of said disk-shaped body;
            a hollow cylindrical protrusion centrally projected from the front surface of said disk-shaped main body and;
            multiple series of radially positioned channels located across said front and back round surfaces of said disk-shaped main body, said channels ending in openings around the hollow cylindrical protrusion and;
wherein the cylindrical section, the truncated cone-shaped elongated body and the bell-shaped section constitute a single physically connected unit having their respective internal cavities in a continuous and straight forwarding position, thus providing a straight fluid path and wherein by matching or snapping the outwardly projected annular flanged section perpendicularly located around the lower section of said bell-shaped lower section with the curved continuous edge projected outwardly in reference to the front surface of said injection button that surrounds the distal edge in reference to the center of the disk-shaped main body said injection button is coupled in a strong and non-permanent manner to said single unit comprising the cylindrical section, the truncated cone-shaped main body and the bell-shaped section.

2. The nozzle as recited in claim 1, further comprising multiple lateral grooves around the circumference of the hollow cylindrical protrusion of the injection button.

3. The nozzle as recited in claim 1, wherein all its parts are made of plastic.

4. The nozzle as recited in claim 3, wherein the plastic is polypropylene.

5. The nozzle as recited in claim 2, wherein all its parts are made of plastic.

6. The nozzle as recited in claim 5, wherein the plastic is polypropylene.

\* \* \* \* \*